(12) United States Patent
Fjeldheim et al.

(10) Patent No.: US 12,311,207 B2
(45) Date of Patent: May 27, 2025

(54) AUTOMATED GRID STORAGE AND RETRIEVAL SYSTEM WITH FOAM-BASED FIRE PREVENTION SYSTEM

(71) Applicant: Autostore Technology AS, Nedre Vats (NO)

(72) Inventors: Ivar Fjeldheim, Haugesund (NO); Trond Austrheim, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 626 days.

(21) Appl. No.: 17/442,384

(22) PCT Filed: Mar. 23, 2020

(86) PCT No.: PCT/EP2020/057979
§ 371 (c)(1),
(2) Date: Sep. 23, 2021

(87) PCT Pub. No.: WO2020/193475
PCT Pub. Date: Oct. 1, 2020

(65) Prior Publication Data
US 2022/0168600 A1    Jun. 2, 2022

(30) Foreign Application Priority Data

Mar. 25, 2019  (NO) .................................. 20190398
Aug. 12, 2019  (NO) .................................. 20190975

(51) Int. Cl.
*A62C 3/00* (2006.01)
*A62C 2/08* (2006.01)
(Continued)

(52) U.S. Cl.
CPC ................. *A62C 3/002* (2013.01); *A62C 2/08* (2013.01); *A62C 31/12* (2013.01); *B65G 1/0464* (2013.01); *B65G 2207/22* (2013.01)

(58) Field of Classification Search
CPC ........... A62C 3/002; A62C 2/08; A62C 31/12; B65G 1/0464; B65G 2207/22
(Continued)

(56) References Cited

U.S. PATENT DOCUMENTS 3,602,313 A    8/1971   Achs
4,789,293 A   12/1988   Hashimoto et al.
(Continued)

FOREIGN PATENT DOCUMENTS

CN    201835716 U    5/2011
CN    106714911 A    5/2017
(Continued)

OTHER PUBLICATIONS

Search Report issued in Norwegian Application No. 20190398; Dated Oct. 24, 2019 (2 pages).
(Continued)

*Primary Examiner* — Christopher S Kim
(74) *Attorney, Agent, or Firm* — Baker Botts L.L.P.

(57) ABSTRACT

An autonomous grid storage system (1) with a foam based fire prevention system. The autonomous grid storage system is in the form of a grid storage structure (104) dived into sub grids (10A, 10B, 10C) separated by firebreak or firebreaks (12). A foam dispensing system (20) dispenses a fire-retardant foam into the firebreak or firebreaks in the event of fire.

9 Claims, 5 Drawing Sheets

(51) Int. Cl.
  *A62C 31/12* (2006.01)
  *B65G 1/04* (2006.01)
(58) Field of Classification Search
  USPC .................. 169/43, 46, 48, 66, 68, 70
  See application file for complete search history.

(56) References Cited

U.S. PATENT DOCUMENTS

| | | | |
|---|---|---|---|
| 2012/0039694 A1 | 2/2012 | Suzanne | |
| 2015/0027739 A1* | 1/2015 | Multer | A62C 3/002 |
| | | | 169/37 |
| 2018/0044110 A1 | 2/2018 | Clarke et al. | |
| 2018/0128532 A1 | 5/2018 | Hognaland | |
| 2019/0062064 A1 | 2/2019 | Ogawa et al. | |

FOREIGN PATENT DOCUMENTS

| | | |
|---|---|---|
| CN | 106968358 A | 7/2017 |
| CN | 107235280 A | 10/2017 |
| CN | 109125978 A | 1/2019 |
| DE | 2041414 A1 | 3/1971 |
| DE | 102018201929 A1 | 8/2019 |
| EP | 1306507 A1 | 5/2003 |
| EP | 3423164 A1 | 1/2019 |
| JP | H05146523 A | 6/1993 |
| JP | H05178571 A | 7/1993 |
| JP | 2007261729 A | 10/2007 |
| JP | 2018047995 A | 3/2018 |
| NO | 317366 B1 | 10/2004 |
| TW | 201424793 A | 7/2014 |
| WO | 2008145809 A1 | 12/2008 |
| WO | 2014075937 A1 | 5/2014 |
| WO | 2014090684 A1 | 6/2014 |
| WO | 2015104263 A2 | 7/2015 |
| WO | 2015193278 A1 | 12/2015 |
| WO | 2017137276 A1 | 8/2017 |
| WO | 17148963 A1 | 9/2017 |
| WO | 2017211634 A1 | 12/2017 |
| WO | 2018033426 A1 | 2/2018 |

OTHER PUBLICATIONS

Search Report issued in Norwegian Application No. 20190975; Dated Feb. 13, 2020 (2 pages).
International Search Report issued in International Application No. PCT/EP2020/057979, mailed Jun. 22, 2020 (5 pages).
Written Opinion issued in International Application No. PCT/EP2020/057979; Dated Jun. 22, 2020 (6 pages).
Office Action issued in Chinese Application No. 2020800243064 mailed on Aug. 3, 2022 (7 pages).
Office Action issued in Chinese Application No. 2020800243844 mailed on Sep. 5, 2022 (10 pages).

* cited by examiner

AUTOMATED GRID STORAGE AND RETRIEVAL SYSTEM WITH FOAM-BASED FIRE PREVENTION SYSTEM

BACKGROUND AND PRIOR ART

Grid Storage Systems, Generally

Figure 1:
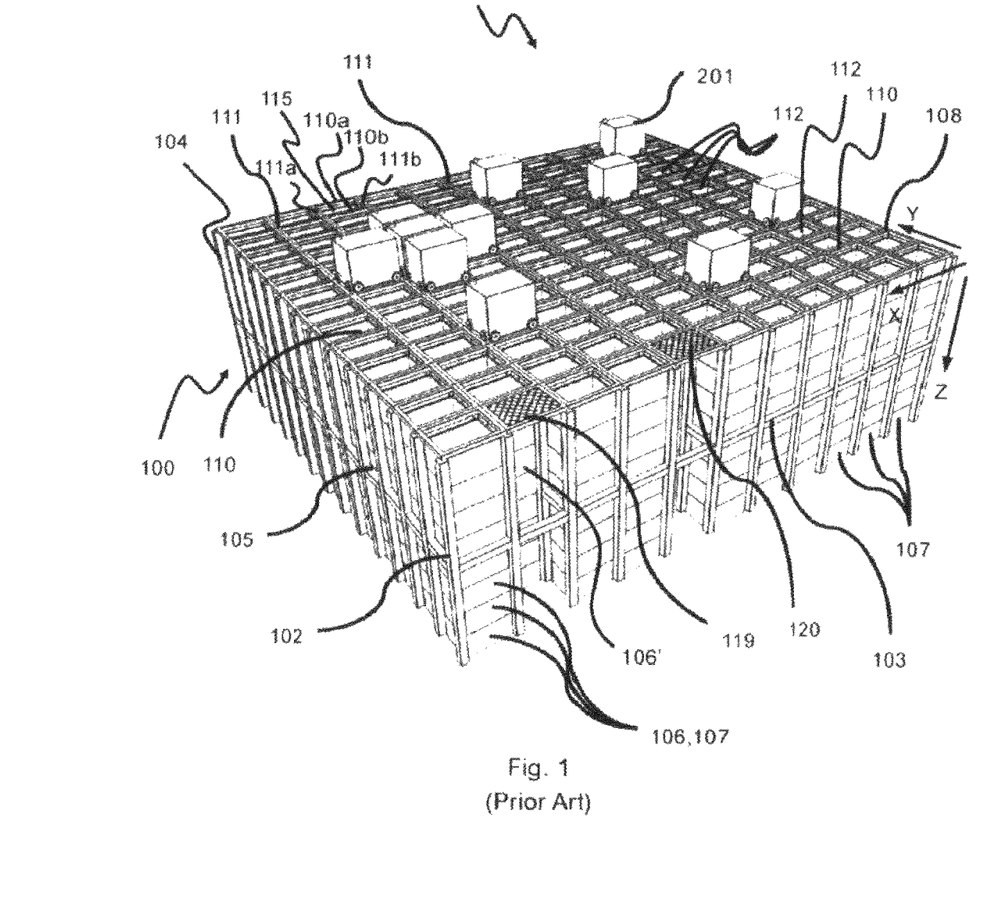
FIG. 1 is a perspective view of a prior art automated grid storage and retrieval system.
Figure 2:
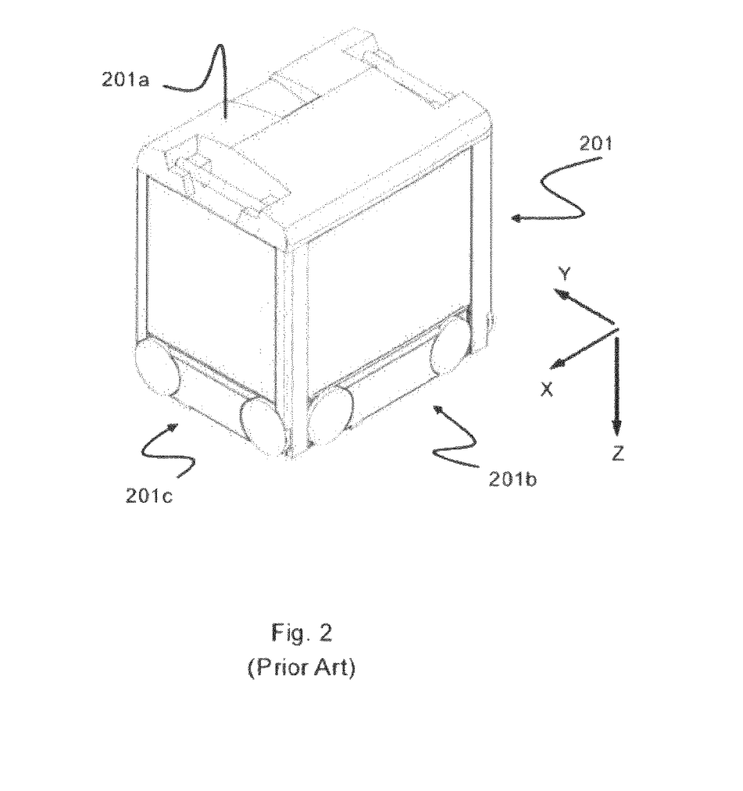
FIG. 2 is a perspective view of a prior art bin handling vehicle having a centrally arranged cavity for containing storage bins therein.
Figure 3:
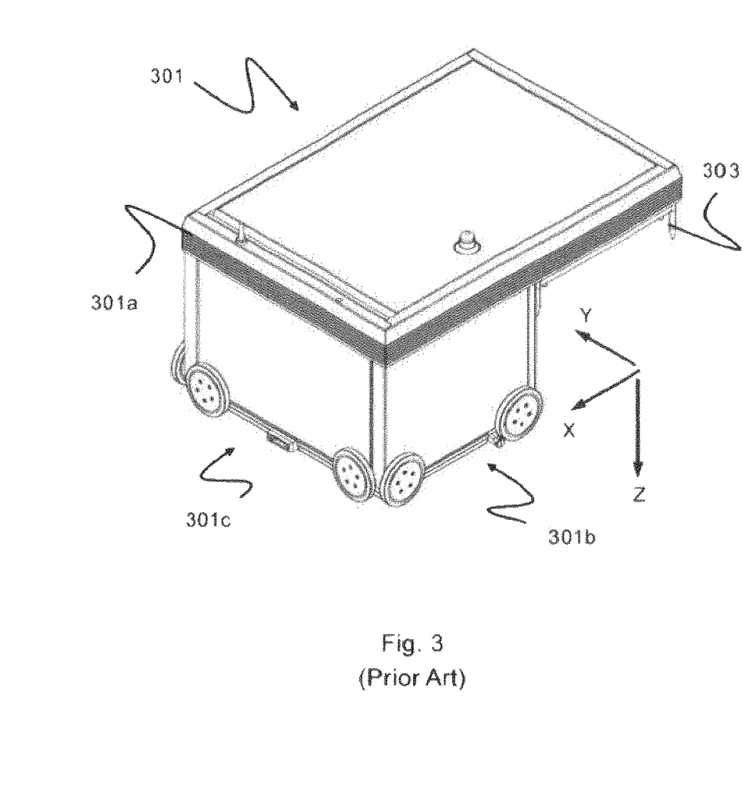
FIG. 3 is a perspective view of a prior art bin handling vehicle having a cantilever for containing storage bins underneath.

An automated storage and retrieval system that comprises a grid storage system is known in the art. As used herein, the term "autonomous grid storage system" or "grid storage system" or "automated grid storage and retrieval system" and the like means a storage system comprising the following features and elements:

FIG. 1 discloses a typical prior art automated storage and retrieval system 1 with a framework structure 100 and FIGS. 2 and 3 disclose two different prior art bin handling vehicles 201, 301 suitable for operating on such a system 1.

The framework structure 100 comprises a number of upright members/vertical members 102 and a number of horizontal members 103 which can be supported by the vertical members 102 and/or be arranged at the base of the framework structure 100 (not shown). When the horizontal members 103 are arranged at the base of the framework structure 100, they may be arranged in a grid pattern supporting the vertical members 102. The members 102, 103 may typically be made of metal, e.g. extruded aluminium profiles.

The framework structure 100 defines a storage grid structure 104 comprising storage columns 105 arranged in rows. In these storage columns 105, storage bins 106 (also known as storage containers) are stacked one on top of another to form stacks 107. The storage grid structure 104 guards against horizontal movement of the stacks 107 of storage bins 106, and guides vertical movement of the bins 106, but normally does not otherwise support the storage bins 106 when they are stacked.

The automated storage and retrieval system 1 comprises a rail system 108 arranged in a grid pattern across the top of the storage grid structure 104, on which rail system 108 a plurality of bin handling vehicles 201, 301 are operated to raise storage bins 106 from, and lower storage bins 106 into, the storage columns 105, and also to transport the storage bins 106 above the storage columns 105. The rail system 108 comprises a first set of parallel rails 110 arranged to guide movement of the bin handling vehicles 201, 301 in a first direction X across the top of the frame structure 100, and a second set of parallel rails 111 arranged perpendicular to the first set of rails 110 to guide movement of the bin handling vehicles 201, 301 in a second direction Y which is perpendicular to the first direction X. In this way, the rail system 108 defines grid columns 112 above which the bin handling vehicles 201, 301 can move laterally above the storage columns 105, i.e. in a plane which is parallel to the horizontal X-Y plane.

Each prior art bin handling vehicle 201, 301 comprises a vehicle body 201a, 301a, and first and second sets of wheels 201b, 301b, 201c, 301c which enable the lateral movement of the bin handling vehicles 201, 301 in the X direction and in the Y direction, respectively. In FIGS. 2 and 3 two wheels in each set are fully visible. The first set of wheels 201b, 301b is arranged to engage with two adjacent rails of the first set of rails 110, and the second set of wheels 201c, 301c is arranged to engage with two adjacent rails of the second set of rails 111. Each set of wheels 201b, 301b 201c, 301c can be lifted and lowered, so that the first set of wheels 201b, 301b and/or the second set of wheels 201c, 301c can be engaged with the respective set of rails 110, 111 at any one time.

Each prior art bin handling vehicle 201, 301 also comprises a lifting device (not shown) for vertical transportation of storage bins 106, e.g. raising a storage bin 106 from, and lowering a storage bin 106 into, a storage column 105. The lifting device comprises one or more gripping/engaging devices 303 which are adapted to engage a storage bin 106. The gripping/engaging devices 303 can be lowered from the vehicle 201, 301 so that the position of the gripping/engaging devices 303 with respect to the vehicle 201, 301 can be adjusted in a third direction Z which is orthogonal to the first direction X and the second direction Y. Further details with regard to the lifting device are described in e.g. WO 2017/211634 A1, the contents of which are incorporated herein by reference.

Conventionally, and also for the purpose of this application, Z=1 identifies the uppermost layer of the storage grid structure 104, i.e. the layer immediately below the rail system 108, Z=2 the second layer below the rail system 108, Z=3 the third layer below the rail system 108 etc. In the exemplary prior art storage grid structure disclosed in FIG. 1, Z=8 identifies the lowermost, bottom layer of the storage grid structure 104. Similarly, X=1 . . . n and Y=1 . . . n identifies the position of each grid column 112 in the horizontal plane. Consequently, as an example, and using the Cartesian coordinate system X, Y, Z indicated in FIG. 1, the storage bin identified as 106' in FIG. 1 can be said to occupy grid location or cell X=10, Y=2, Z=3. The bin handling vehicles 201, 301 can be said to travel in layer Z=0, and each grid column 112 can be identified by its X and Y coordinates.

Each prior art bin handling vehicle 201, 301 comprises a storage compartment or space for receiving and stowing a storage bin 106 when transporting the storage bin 106 across the rail system 108. The storage space may comprise a cavity arranged centrally within the vehicle body 201a as shown in FIG. 2 and as described in e.g. WO 2015/193278 A1 and WO 2018/033426 A1, the contents of which are incorporated herein by reference.

FIG. 3 shows an alternative configuration of a bin handling vehicles 301 with a cantilever construction. Such a vehicle is described in detail in e.g. NO317366, the contents of which are also incorporated herein by reference.

The central cavity bin handling vehicles 201 shown in FIG. 2 may have a footprint that covers an area with dimensions in the X and Y directions which is generally equal to the lateral extent of a grid column 112, i.e. the extent of a grid column 112 in the X and Y directions, e.g. as is described in WO 2015/193278 A1, the contents of which are incorporated herein by reference. The term 'lateral' used herein may mean 'horizontal'.

Alternatively, the central cavity bin handling vehicles 201 may have a footprint which is larger than the lateral area defined by a grid column 112, e.g. as is disclosed in WO 2014/090684 A1.

Figure 4:
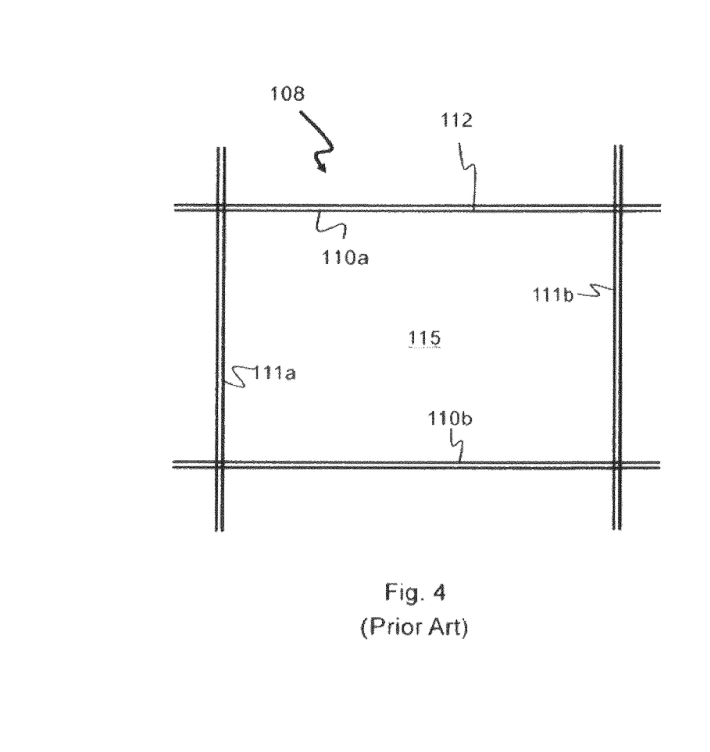
FIG. 4 is a top view of a prior art single rail grid.
Figure 5:
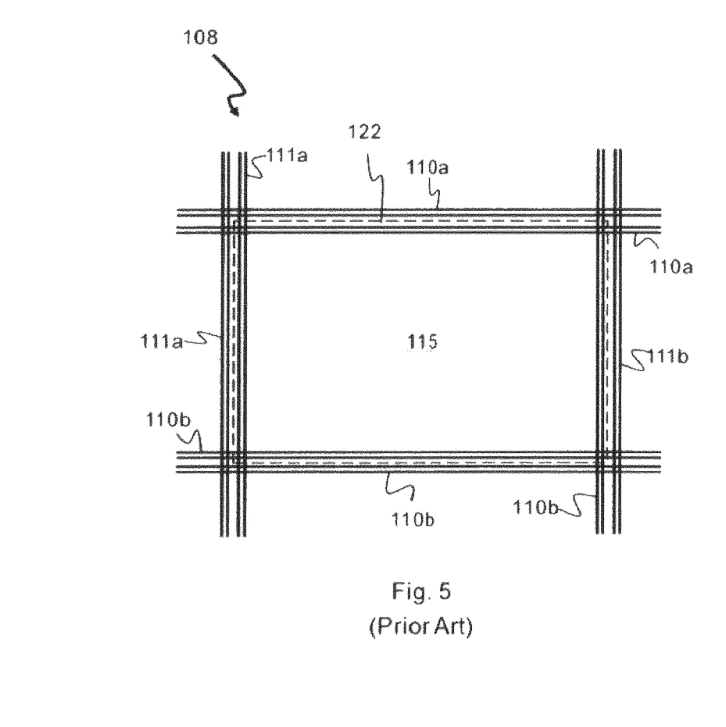
FIG. 5 is a top view of a prior art double rail grid.

The rail system 108 may be a single rail system, as is shown in FIG. 4. Alternatively, the rail system 108 may be a double rail system, as is shown in FIG. 5, thus allowing a bin handling vehicle 201 having a footprint generally corresponding to the lateral area defined by a grid column 112 to travel along a row of grid columns even if another bin handling vehicle 201 is positioned above a grid column neighbouring that row. Both the single and double rail system, or a combination comprising a single and double rail arrangement in a single rail system 108, form a grid pattern in the horizontal plane P comprising a plurality of rectangular and uniform grid locations or grid cells 122, where each grid cell 122 comprises a grid opening 115 being delimited by a pair of rails 110*a*, 110*b* of the first set of rails 110 and a pair of rails 111*a*, 111*b* of the second set of rails 111. In FIG. 5 the grid cell 122 is indicated by a dashed box.

Consequently, rails 110*a* and 110*b* form pairs of rails defining parallel rows of grid cells running in the X direction, and rails 111*a* and 111*b* form pairs of rails defining parallel rows of grid cells running in the Y direction.

Figure 6:
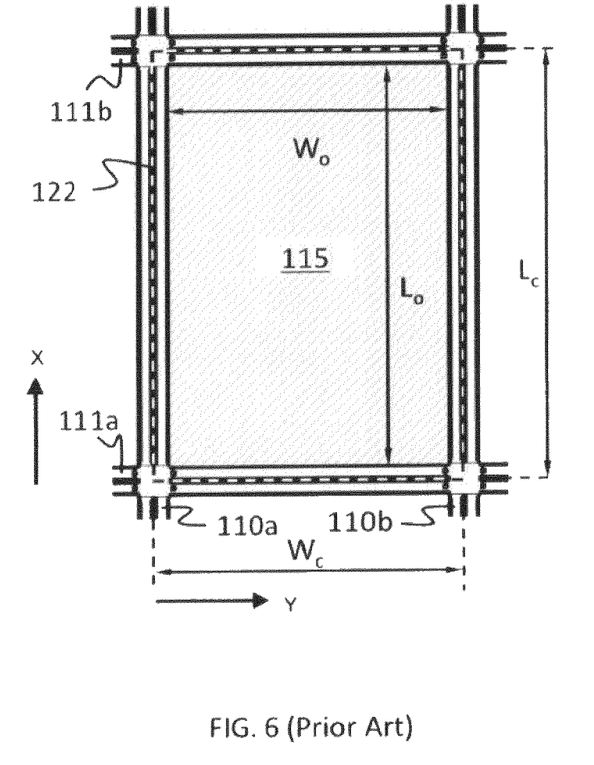
FIG. 6 is a top view of grid column

As shown in FIG. 6, each grid cell 122 has a width $W_c$ which is typically within the interval of 30 to 150 cm, and a length $L_c$ which is typically within the interval of 50 to 200 cm. Each grid opening 115 has a width $W_o$ which is typically 2 to 10 cm less than the width $W_c$ of the grid cell 122. Each grid opening 115 has a length $L_o$ which is typically 2 to 10 cm less than the length $L_c$ of the grid cell 122.

In the X and Y directions, neighbouring grid cells are arranged in contact with each other such that there is no space between neighbouring grid cells.

In a storage grid structure 104, a majority of the grid columns 112 are storage columns 105, i.e. grid columns 105 where storage bins 106 are stored in stacks 107. However, a storage grid structure 104 normally has at least one grid column 112 which is not used for storing storage bins 106, but which comprises a location where the bin handling vehicles 201, 301 can drop off and/or pick up storage bins 106 so that they can be transported to an access station (not shown) where the storage bins 106 can be accessed from outside of the storage grid structure 104 or transferred out of or into the storage grid structure 104. Within the art, such a location is normally referred to as a 'port' and the grid column 112 in which the port is located may be referred to as a 'port column' 119, 120. The transportation to the access station may be in any direction, that is horizontal, tilted and/or vertical. For example, the storage bins 106 may be placed in a random or dedicated grid column 112 within the storage grid structure 104, then picked up by any bin handling vehicle and transported to a port 119, 120 for further transportation to an access station. Note that the term 'tilted' means transportation of storage bins 106 having a general transportation orientation somewhere between horizontal and vertical.

The storage grid structure 104 in FIG. 1 comprises two port columns 119 and 120. The first port column 119 may for example be a dedicated drop-off port column where the bin handling vehicles 201, 301 can drop off storage bins 106 to be transported to an access station or a transfer station, and the second port column 120 may be a dedicated pick-up port column where the bin handling vehicles 201, 301 can pick up storage bins 106 that have been transported to the storage grid structure 104 from an access station or a transfer station.

The access station may typically be a picking station or a stocking station where product items are removed from or positioned into the storage bins 106. In a picking station or a stocking station, the storage bins 106 are normally never removed from the automated storage and retrieval system 1, but are returned into the storage grid structure 104 once accessed. A port 119, 120 can also be used for transferring storage bins out of or into the grid 104, e.g. for transferring storage bins 106 to another storage facility (e.g. to another grid or to another automated storage and retrieval system), to a transport vehicle (e.g. a train or a lorry), or to a production facility.

A conveyor system comprising conveyors is normally employed to transport the storage bins between the ports 119, 120 and the access station.

In an alternative embodiment, dedicated bin transport vehicles may operate on a lower level to transport bins from ports to an access station.

If the ports 119, 120 and the access station are located at different levels, the conveyor system may comprise a lift device with a vertical component for transporting the storage bins 106 vertically between the port 119, 120 and the access station.

The conveyor system may be arranged to transfer storage bins 106 between different grids, e.g. as is described in WO 2014/075937 A1, the contents of which are incorporated herein by reference.

When a storage bin 106 stored in the grid 104 disclosed in FIG. 1 is to be accessed, one of the bin handling vehicles 201, 301 is instructed to retrieve the target storage bin 106 from its position in the storage grid structure 104 and transport it to the drop-off port 119. This operation involves moving the bin handling vehicle 201, 301 to a grid location above the storage column 105 in which the target storage bin 106 is positioned, retrieving the storage bin 106 from the storage column 105 using the bin handling vehicle's 201, 301 lifting device (not shown), and transporting the storage bin 106 to the drop-off port 119. If the target storage bin 106 is located deep within a stack 107, i.e. with one or a plurality of other storage bins 106 positioned above the target storage bin 106, the operation also involves temporarily moving the above-positioned storage bins prior to lifting the target storage bin 106 from the storage column 105. This step, which is sometimes referred to within the art as "digging", may be performed with the same bin handling vehicle 201, 301 that is subsequently used for transporting the target storage bin 106 to the drop-off port 119, or with one or a plurality of other cooperating bin handling vehicles 201, 301. Alternatively, or in addition, the automated storage and retrieval system 1 may have bin handling vehicles 201, 301 specifically dedicated to the task of temporarily removing storage bins 106 from a storage column 105. Once the target storage bin 106 has been removed from the storage column 105, the temporarily removed storage bins 106 can be repositioned into the original storage column 105. However, the removed storage bins 106 may alternatively be relocated to other storage columns 105.

When a storage bin 106 is to be stored in the storage grid structure 104, one of the bin handling vehicles 201, 301 is instructed to pick up the storage bin 106 from the pick-up port 120 and transport it to a grid location above the storage column 105 where it is to be stored. After any storage bins positioned at or above the target position within the storage column stack 107 have been removed, the bin handling vehicle 201, 301 positions the storage bin 106 at the desired position. The removed storage bins 106 may then be lowered back into the storage column 105 or relocated to other storage columns 105.

The automated storage and retrieval system 1 comprises a control system for monitoring and controlling the automated storage and retrieval system 1, e.g. for monitoring and controlling the location of respective storage bins 106 within the storage grid structure 104, monitoring the content of each storage bin 106, and monitoring and controlling the movement of the bin handling vehicles 201, 301 so that a desired storage bin 106 can be delivered to the desired location at the desired time without the bin handling vehicles 201, 301 colliding with each other. The control system is typically computerized and typically comprises a database for keeping track of the storage bins 106.

The automated storage and retrieval system 1 may comprise bin handling vehicles, charging station(s) for charging the bin handling vehicles and a wireless communication system. Such features are also known from WO 2015/104263 A1, which is incorporated herein by reference.

In an embodiment of a grid storage system, a bin lift device for transporting bins in a vertical direction may be employed if a storage grid structure 104 is placed underneath another storage grid structure 104 as known from WO 2014/075937 A1, which is incorporated herein by reference.

Fire Hazard

As is evident from the discussion above, a grid storage system has many advantages over a traditional storage warehouse. A principal advantage is that a grid storage system more efficiently utilizes the available warehouse space, with items being stored in a particularly dense arrangement. However, there is also a desire to provide a warehouse with a grid storage system arrangement that can reduce the risk of damage to the warehouse and its contents in the event of a fire.

SUMMARY OF THE INVENTION

The present invention is set forth and characterized in the independent claims, while the dependent claims describe preferred or optional features of the invention. The present invention provides a warehouse with a grid storage system that is designed to contain a fire in a manageable, segregated section of the warehouse.

According to one aspect, the invention comprises a grid storage system as described above, wherein
  the storage grid structure is arranged as a plurality of sub grids, wherein adjacent sub grids are separated by a firebreak, for example in the form of an aisle,
  a foam dispensing system is arranged in connection with the firebreak for dispensing a fire-retardant foam into the firebreak or firebreaks in the event of a fire,
  adjacent sub grids are co-joined by one or more bridges in the form of sections of track upon which the bin handling vehicles may pass over the firebreak or firebreaks.

In various embodiments, the invention comprises an autonomous grid storage system arranged in a warehouse space. The warehouse may comprise a space having a single floor or may be arranged on a plurality of floors.

The autonomous grid storage system is divided within the warehouse space, for example on a single floor of said space, into a plurality of sub grids separated by firebreaks. In one embodiment the firebreaks are rows of storage columns of an installed large grid that are devoid of storage bins. In another aspect the firebreaks are in the form of a gap between adjacent faces of sub grids that are constructed in near proximity to each other.

As can be appreciated by one skilled in the art, the number and orientation of the firebreaks may have various arrangements. In some embodiments one or more firebreaks may traverse the entire width of the grid in one direction. In other embodiments firebreaks may intersect, thus dividing the grid into a number of sections or zones.

At the firebreaks, the adjacent faces of the sub grids along the firebreaks may be lined with a fire barrier material, thereby separating the internal grid structure of the sub grids from the firebreak space. The fire barrier material is preferably a suitable fire barrier material, for example steel or other non-combustible material, according to applicable national and international fire prevention standards, such as for example NFPA and/or ICC IBC.

Within or above the firebreaks is arranged a dispensing apparatus for dispensing a fire resistant or retardant foam into the firebreak in the event of a fire. As can be appreciated, in the event a fire is detected in the warehouse space, an alarm may be triggered which activates the dispensing apparatus and releases the foam.

A steel mesh grating may be arranged between sub grids to provide a working platform for staff or firefighters. The mesh is arranged to allow the foam to flow down into the firebreak space below the grate.

The foam material is advantageously of the type that expands upon release, and the dispensing apparatus is preferably arranged to dispense a sufficient amount of foam to completely fill the volume of the firebreak between adjacent faces of the sub grids. The fire barrier material lining the face of the sub grids prevents foam from flowing into the interior of the sub grids, which could damage product in the containers. In the event of fire, the foam-filled firebreaks, together with the fire barrier material itself, thereby function as an improved fire barrier between sub grids. The foam material adds an additional degree of heat and fire resistance compared to an empty space lined with fire walls.

According to one aspect, an overflow drain is arranged at or near the top level of firebreak, such that excess foam is to a large extent prevented from flowing over the top of the firebreaks and into areas of the grid outside the firebreak. A drainage system may be arranged at the floor of the firebreak through which the foam may washed once the danger of fire has subsided. In one embodiment a system of sprinklers or water jets may be directed towards the firebreaks in order to automatically wash dispensed foam through the drainage system.

One or more bridges is/are arranged between adjacent sub grids to allow bin handling vehicles to traverse between the sub grids over the firebreaks. The bridges comprise one or more sets of parallel rails connecting the rail systems of adjacent sub grids, such that bins handling vehicles may traverse over the bridges from the rail system of one sub grid to the rail system of an adjacent sub grid. Where the firebreaks are merely rows of storage columns devoid of storage containers, the rail system would act as a bridge traversing every grid cell of the firebreak.

When the foam dispensing system of the invention is activated and fills an firebreak with foam, a fire will be contained to a more manageable section of the warehouse space, assisting in any firefighting operation and reducing the risk of total loss for the facility. The foam material will in addition reduce the spread of smoke between sub grids, thus further reducing the amount of loss in sub grids not affected by the fire itself.

The above arrangement of the storage system may be combined with additional, active fire prevention and firefighting apparatus, such as emergency lighting, heat detectors, sprinkler systems, introduction of inert gas or other measures. In one embodiment, the sprinkler system may be an intelligent system that activates only in the section of the warehouse space in which fire is detected.

Since the storage system in divided into sections behind firewalls, the unaffected sections of the storage facility can thus hopefully avoid water damage due to the sprinkler system activating over the entire facility.

BRIEF DESCRIPTION OF THE DRAWINGS

The following drawings are appended to facilitate the understanding of the invention. The drawings show embodiments of the invention, which will now be described by way of example only, where.

DETAILED DESCRIPTION OF THE INVENTION

FIGS. 1-6 collectively illustrate an autonomous grid storage system 1 as known in the prior art, such as, for example, the Autostore® system of the present applicant. As shown in FIG. 1, a salient feature of such a system is the dense, efficient utilization of as much of a usable space in a warehouse area as possible.

According to the present invention, fire safety is improved by dividing the storage grid structure 104 into a plurality of sub grids separated by firebreaks, with apparatus arranged for dispensing a fire retardant foam into the firebreaks in the event of fire.

Figure 7:
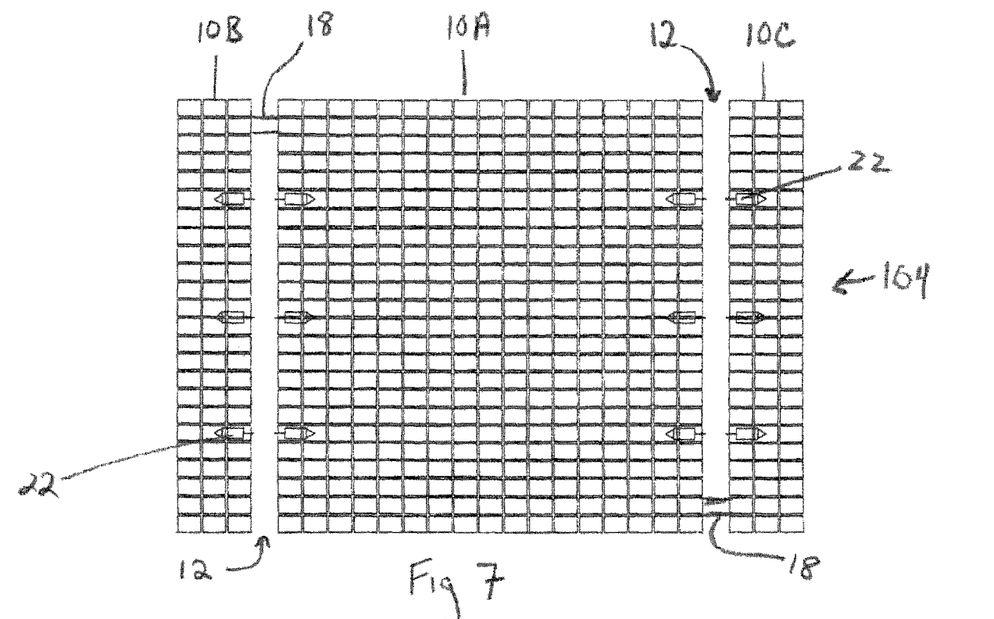
FIG. 7 is a top view of one possible arrangement of sub grids
Figure 8:
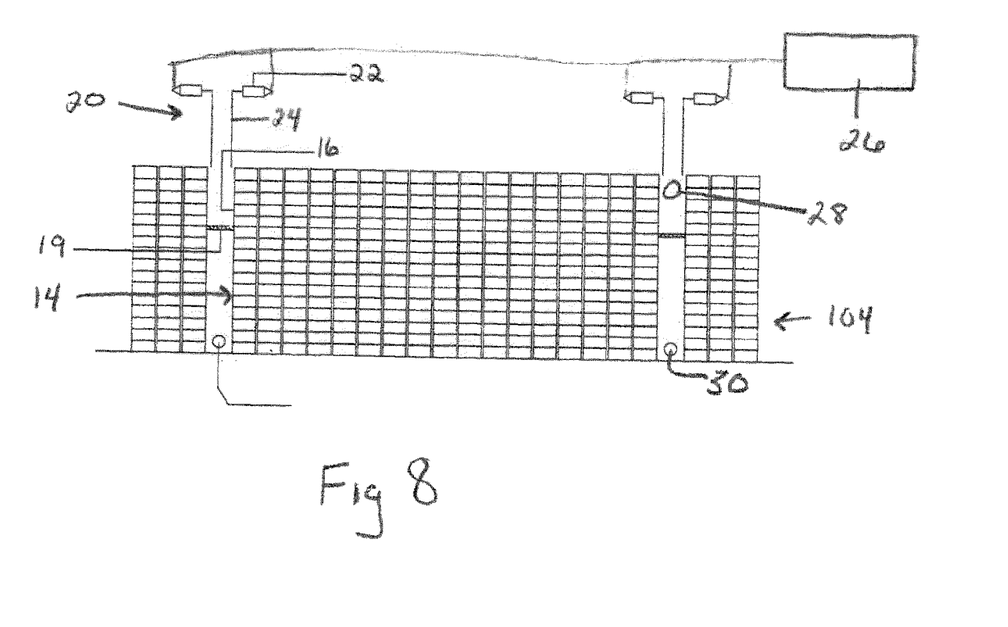
FIG. 8 is a side elevational view of one possible arrangement of sub grids.

FIGS. 7 and 8 shows a storage grid structure 104 dived into three sub grids 10A, 10B and 10C. While FIGS. 7 and 8 illustrates three sub grids, it should be understood that the storage grid structure can be divided into any number, size or configuration of sub grids, depending on the size of grid storage system, fire safety regulations mandating grid size, or other considerations.

In one embodiment of the invention, illustrated in FIGS. 7 and 8, the sub grids 10A, 10B and 10C are separated by firebreaks 12. The embodiment illustrated in the figures shows the firebreaks 12 being parallel and crossing the entire width of the grid structure. It should be understood however that firebreaks 12 may also run perpendicular to each other such that the firebreaks intersect, thereby dividing the grid structure into a plurality of sub grids, some of which being in the interior of the grid structure.

Each firebreak 12 is preferably formed by converting an entire row of storage columns of an installed grid structure to the purpose of forming the firebreak, with the storage columns being devoid of storage containers. This permits the storage system to be installed in the normal manner, with the location and arrangement of the firebreaks determined according to need. This further permits the number of, and arrangement of, the firebreaks to be modified in the future, simply by removing storage containers from different rows as need arises. This has the further advantage of avoiding complicated software adjustments in the control software for the automated storage system, as the grid pattern of the storage system remains intact.

Alternatively, however, the firebreaks 12 may be arranged as a gap between independently assembled sub grids installed in proximity to one another so as to form an firebreak between adjacent sub grids.

As shown in FIG. 8, the sub grids have a vertical grid face 14 adjacent to firebreaks 12. Grid face 14 is lined with a fire barrier material 16. In addition to being a fire barrier, the material lining the grid face prevents foam from flowing into the interior of the sub grids and damaging articles in the containers. Fire barrier material 16 is preferably a material known in the art as a suitable fire barrier material, for example steel or other non-combustible material, in compliance with applicable national and international fire prevention standards, such as for example NFPA and/or ICC IBC.

One or more bridges 18 are arranged between sub grids to permit bin handling vehicles to travel between sub grids over firebreaks 12. FIG. 7 illustrates one bridge 18 crossing between adjacent sub grids, but it should be understood that any number of bridges is possible within the scope of the invention. In one embodiment, every grid space of each firebreak has a bridge 18, thereby permitting the control software to operate as if the storage system comprised a single large grid.

One or more steel mesh grates 19 may be arranged between sub grids at a convenient height to provide a working platform for staff or firefighters. The mesh is arranged to allow the foam to flow down into the firebreak space below the grate.

As illustrated in FIG. 8, the autonomous grid storage system 1 of the present invention further comprises a foam dispensing system 20 arranged to discharge a fire-retardant foam into firebreaks 12 in the event of a fire. Foam dispensing systems are known in the art, and comprise components and parameter known to those skilled in the art of fire prevention. Such components may include, as conceptually illustrated, a plurality of nozzles 22, supply piping 24 and a supply/reservoir 26 for foam. According to one embodiment, nozzles 22 are medium-expansion foam nozzles arranged to dispense from 100 to 6000 litres per minute of foam, depending upon the volume of the space in firebreak 12 to be filled.

One or more drains are arranged in connection with firebreaks 12. FIG. 8 illustrates an embodiment where an upper drain 28 is arranged at or near the top level of firebreak 12, in order to prevent excess foam from flowing over the top of the firebreak and into the interior of adjacent sub grids. A lower drain 30 at or near the base of firebreaks 12 is arranged to drain away the foam after the danger of fire has subsided. The foam may for example be flushed into lower drain 30 by water from hoses or a dedicated sprinkler system (not illustrated).

In the event of fire, an alarm will activate the foam dispensing system, preferably only in the area in which fire is detected. The foam dispensing system will completely fill firebreak 12 with fire retardant foam, thus mitigating the spread of fire. When the danger of fire has subsided, the foam may be flushed with water through the lower drains 30.

REFERENCE NUMERALS

1 Storage and retrieval system (prior art)
100 Framework structure
102 Upright members/vertical members of framework structure
103 Horizontal members of framework structure
104 Storage grid structure
105 Storage column
106 Storage bin
106' Particular position of storage bin
107 Stack
108 Rail system/track system
110 Parallel rails in first direction (X)
110a First rail of neighboring rails 110
110b Second rail of neighboring rails 110

111 Parallel rails in second direction (Y)
111a First rail of neighboring rails 111
111b Second rail of neighboring rails 111
112 Grid column
115 Grid opening
119 First port column/first port
120 Second port column/second port
122 Grid cell/storage cell
201 Prior art single cell bin handling vehicle
201a Vehicle body of the bin handling vehicle 201
201b Drive means/wheel arrangement, first direction (X)
201c Drive means/wheel arrangement, second direction (Y)
301 Prior art cantilever bin handling vehicle
301a Vehicle body of the bin handling vehicle 301
301b Drive means in first direction (X)
301c Drive means in second direction (Y)
303 Gripping/engaging device
10A/10B/10C Sub grids
12 Firebreak
14 Grid face
16 Fire barrier material
18 Bridge
19 Mesh grates
20 Foam dispensing system
22 Nozzle
24 Piping
26 Foam supply/reservoir
28 Upper drain
30 Lower drain

The invention claimed is:

1. An automated grid storage and retrieval system comprising:
   a storage grid structure comprising a rail system comprising a first set of parallel rails arranged in a horizontal plane and extending in a first direction, and a second set of parallel rails arranged in the horizontal plane and extending in a second direction which is orthogonal to the first direction, which first and second sets of rails form a grid pattern in the horizontal plane comprising a plurality of grid cells, each grid cell comprising a grid opening defined by a pair of rails of the first set of rails and a pair of rails of the second set of rails;
   a plurality of vertical members defining a plurality of storage columns arranged into a storage grid, each storage column being arranged to store a respective stack of storage bins, wherein the storage columns are located beneath the rail system, wherein each storage column is located vertically below a respective grid opening;
   wherein the storage grid structure is arranged such that a plurality of bin handling vehicles are operable on the rail system for collecting and returning the storage bins to and from the storage columns, said bin handling vehicles being controllable by a control system for monitoring and controlling the automated grid storage and retrieval system,
   wherein the storage grid structure comprises a plurality of sub grids and one or more firebreaks, wherein the sub grids are separated by the one or more firebreaks, and
   wherein the one or more firebreaks each comprise a set of storage columns, of the plurality of storage columns, that are devoid of storage bins and that form an entire row of the storage grid, and that are structurally identical to storage columns, of the plurality of storage columns, arranged to store the respective stacks of storage bins; and
   a foam dispensing system arranged in connection with the one or more firebreaks and configured for dispensing a fire-retardant foam into the one or more firebreaks in an event of a fire.

2. The automated grid storage and retrieval system according to claim 1, wherein the sub grids are co-joined by one or more bridges in the form of sections of the first set of parallel rails or the second set of parallel rails upon which the bin handling vehicles are configured to pass over the one or more firebreaks.

3. The automated grid storage and retrieval system according to claim 1, wherein the foam dispensing system is arranged to dispense a predetermined amount of the fire-retardant foam to fill an entire volume of a space in the one or more firebreaks.

4. The automated grid storage and retrieval system according to claim 1, wherein each sub grid of the plurality of sub grids includes a grid face at an end of the sub grid that faces the one or more firebreaks, said grid face being lined with a fire barrier material and arranged to prevent the fire-retardant foam from flowing into an interior of the sub grid.

5. The automated grid storage and retrieval system according to claim 4, wherein the fire barrier material is formed of steel.

6. The automated grid storage and retrieval system according to claim 1, further comprising an upper overflow drain at an upper level of the one or more firebreaks arranged to drain away excess fire-retardant foam and prevent the fire-retardant foam from flowing into areas of the sub grids outside an aisle or aisles.

7. The automated grid storage and retrieval system according to claim 1, further comprising a lower drain located at a lower level of the one or more firebreaks for draining away the fire-retardant foam.

8. The automated grid storage and retrieval system according to claim 1, further comprising a one or more mesh grates connected between the sub grids, the mesh grates adapted as a service platform.

9. An automated grid storage and retrieval system, comprising:
   a storage grid structure comprising a rail system comprising a first set of parallel rails arranged in a horizontal plane and extending in a first direction, and a second set of parallel rails arranged in the horizontal plane and extending in a second direction which is orthogonal to the first direction, which first and second sets of rails form a grid pattern in the horizontal plane comprising a plurality of grid cells, each grid cell comprising a grid opening defined by a pair of rails of the first set of rails and a pair of rails of the second set of rails;
   a plurality of vertical members defining a plurality of storage columns arranged into a storage grid, each storage column being arranged to store a respective stack of storage bins, wherein the storage columns are located beneath the rail system, wherein each storage column is located vertically below a respective grid opening;
   wherein the storage grid structure is arranged such that a plurality of bin handling vehicles are operable on the rail system for collecting and returning the storage bins to and from the storage columns, said bin handling vehicles being controllable by a control system for monitoring and controlling the automated grid storage and retrieval system, wherein the storage grid structure comprises a plurality of sub grids and one or more firebreaks, wherein the sub grids are separated by the one or more firebreaks, and wherein the one or more firebreaks each comprise a set of storage columns, of the plurality of storage columns, that are devoid of storage bins and that form an entire row of the storage grid, and that are structurally identical to storage columns, of the plurality of storage columns, arranged to store the respective stacks of storage bins;

a foam dispensing system arranged in connection with the one or more firebreaks and configured for dispensing a fire-retardant foam into the one or more firebreaks in an event of a fire.

* * * * *